United States Patent
Lien et al.

(10) Patent No.: US 9,383,806 B2
(45) Date of Patent: Jul. 5, 2016

(54) MULTI-CORE PROCESSOR INSTRUCTION THROTTLING

(71) Applicant: Apple Inc., Cupertino, CA (US)

(72) Inventors: Wei-Han Lien, San Jose, CA (US); Gerard R Williams, III, Los Altos, CA (US); Rohit Kumar, Santa Clara, CA (US); Sandeep Gupta, Santa Clara, CA (US); Suresh Periyacheri, Austin, TX (US); Shih-Chieh R Wen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 13/864,723

(22) Filed: Apr. 17, 2013

(65) Prior Publication Data

US 2014/0317425 A1 Oct. 23, 2014

(51) Int. Cl.
  *G06F 1/32* (2006.01)
(52) U.S. Cl.
  CPC .............. *G06F 1/3237* (2013.01); *G06F 1/324* (2013.01); *G06F 1/3296* (2013.01); *Y02B 60/1217* (2013.01); *Y02B 60/1221* (2013.01); *Y02B 60/1285* (2013.01)
(58) Field of Classification Search
  CPC .................................................... G06F 1/3234
  See application file for complete search history.

(56) References Cited

U.S. PATENT DOCUMENTS

| 7,337,339 | B1 | 2/2008 | Choquette et al. | |
| 7,437,581 | B2 | 10/2008 | Grochowski et al. | |
| 7,496,772 | B1 * | 2/2009 | Nguyen | G06F 1/3203 713/300 |
| 7,793,125 | B2 | 9/2010 | Berry, Jr. et al. | |
| 7,937,563 | B2 * | 5/2011 | Naffziger et al. | 712/214 |
| 7,992,017 | B2 * | 8/2011 | Safford et al. | 713/320 |
| 8,214,663 | B2 | 7/2012 | Floyd et al. | |
| 8,356,194 | B2 * | 1/2013 | Carlson et al. | 713/320 |
| 2004/0113803 | A1 * | 6/2004 | Keown | B01D 35/143 340/648 |
| 2005/0213699 | A1 * | 9/2005 | Boerstler | H03K 23/667 377/47 |
| 2008/0010521 | A1 * | 1/2008 | Goodrum | G06F 11/3062 714/22 |
| 2013/0179710 | A1 * | 7/2013 | Chang | G06F 1/3215 713/322 |
| 2013/0339776 | A1 * | 12/2013 | Jagadishprasad | G06F 9/5094 713/340 |
| 2014/0063915 | A1 * | 3/2014 | Cronie | G11C 7/1006 714/22 |

* cited by examiner

*Primary Examiner* — Mohammed Rehman
(74) *Attorney, Agent, or Firm* — Meyertons, Hood, Kivlin, Kowert & Goetzel, P.C.

(57) ABSTRACT

An apparatus for performing instruction throttling for a multi-processor system is disclosed. The apparatus may include a power estimation circuit, a table, a comparator, and a finite state machine. The power estimation circuit may be configured to receive information on high power instructions issued to a first processor and a second processor, and generate a power estimate dependent upon the received information. The table may be configured to store one or more pre-determined power threshold values, and the comparator may be configured to compare the power estimate with at least one of the pre-determined power threshold values. The finite state machine may be configured to adjust the throttle level of the first and second processors dependent upon the result of the comparison.

19 Claims, 6 Drawing Sheets

MULTI-CORE PROCESSOR INSTRUCTION THROTTLING

BACKGROUND

1. Technical Field

This invention relates to computing systems, and more particularly, to efficiently reducing power consumption through throttling of selected problematic instructions.

2. Description of the Related Art

Geometric dimensions of devices and metal routes on each generation of semiconductor processor cores are decreasing. Therefore, more functionality is provided with a given area of on-die real estate. As a result, mobile devices, such as laptop computers, tablet computers, smart phones, video cameras, and the like, have increasing popularity. Typically, these mobile devices receive electrical power from a battery including one or more electrochemical cells. Since batteries have a limited capacity, they are periodically connected to an external source of energy to be recharged. A vital issue for these mobile devices is power consumption. As power consumption increases, battery life for these devices is reduced and the frequency of recharging increases.

As the density of devices increases on an integrated circuit with multiple pipelines, larger cache memories, and more complex logic, the amount of capacitance that may be charged or discharged in a given clock cycle significantly increases, resulting in higher power consumption. Additionally, a software application may execute particular computer program code that may cause the hardware to reach a high power dissipation value. Such program code could do this either unintentionally or intentionally (e.g., a power virus). The power dissipation may climb due to multiple occurrences of given instruction types within the program code, and the power dissipation may reach or exceed the thermal design power (TDP) or, in some cases, the maximum power dissipation, of an integrated circuit.

In addition to the above, a mobile device's cooling system may be design for a given TDP, or a thermal design point. The cooling system may be able to dissipate a TDP value without exceeding a maximum junction temperature for an integrated circuit. However, multiple occurrences of given instruction types may cause the power dissipation to exceed the TDP for the integrated circuit. Further, there are current limits for the power supply that may be exceeded as well. If power modes do not change the operating mode of the integrated circuit or turn off particular functional blocks within the integrated circuit, the battery may be quickly discharged. In addition, physical damage may occur. One approach to managing peak power dissipation may be to simply limit instruction issue to a pre-determined threshold value, which may result in unacceptable computing performance.

In view of the above, efficient methods and mechanisms for reducing power consumption through issue throttling of selected instructions are desired.

SUMMARY OF THE EMBODIMENTS

Various embodiments of a circuit and method for implementing instruction throttling are disclosed. Broadly speaking, an apparatus and a method are contemplated in which a power estimation circuit is coupled to a first processor and a second processor. The power estimation circuit may be configured to receive high power instruction information from the first and second processors and generate a power estimate dependent upon the received information. A table may be configured to store one or more pre-determined power threshold values. A comparator may be configured to compare the power estimate to at least one of the power threshold values stored in the table. A throttle level for the first processor and the second processor may be adjusting by a finite-state machine coupled to the first processor and the second processor in response to the results of the comparison.

In one embodiment, the power estimation circuit may be further configured to accumulate, over a pre-determined period of time, the high power instruction information from the first processor and the second processor.

In a further embodiment, the power estimation circuit may be further configured to perform finite impulse response (FIR) filtering on the high power instruction information received from the first processor and the second processor.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

To improve computational performance, a system-on-a-chip (SoC) may include multiple processors. While providing additional compute resources, multiple processors may also contribute to higher dynamic and leakage power, which may reduce battery life in mobile computing applications. Various techniques may be employed to manage power consumption in an SoC. Some systems employ clock and power gates, or a combination thereof, to shut down and/or disconnect portions of the system not currently being utilized. Other systems restrict the number of instructions (commonly referred to as "throttling") for processors that result in a large amount of switching activity.

Throttling a processor, however, may result in an unacceptable reduction in computational performance. The determination of when to limit the issue of certain instructions is a difficult, and the addition of multiple processors, further complicates the problem. The embodiments illustrated in the drawings and described below may provide techniques for throttling multiple processors while limiting any degradation in computational performance.

System-on-a-Chip Overview

Figure 1:
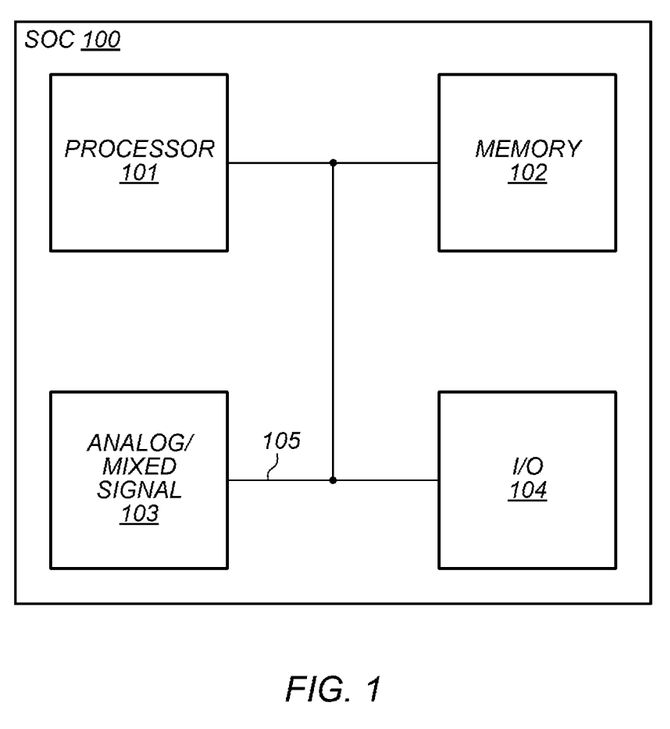
FIG. 1 illustrates an embodiment of a system on a chip.

A block diagram of an SoC is illustrated in FIG. 1. In the illustrated embodiment, the SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone. Transactions on internal bus 105 may be encoded according to one of various communication protocols.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Each of the functional blocks included in SoC 100 may be included in separate power and/or clock domains. In some embodiments, a functional block may be further divided into smaller power and/or clock domains. Each power and/or clock domain may, in some embodiments, be separately controlled thereby selectively deactivating (either by stopping a clock signal or disconnecting the power) individual functional blocks or portions thereof.

Processor Overview

Figure 2:
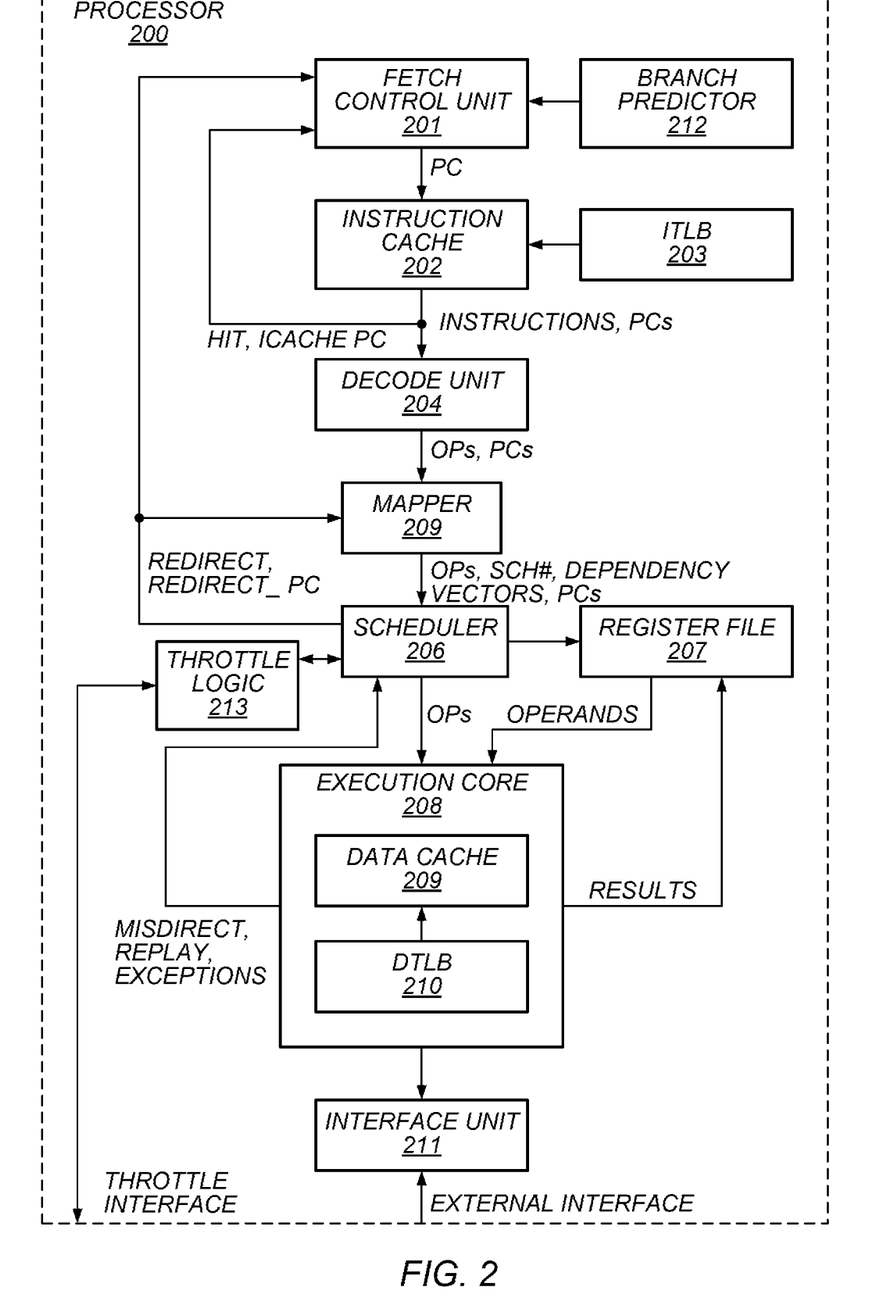
FIG. 2 illustrates an embodiment of a processor.

Turning now to FIG. 2, a block diagram of an embodiment of a processor 200 is shown. In the illustrated embodiment, the processor 200 includes a fetch control unit 201, an instruction cache 202, a decode unit 204, a mapper 205, a scheduler 206, a register file 207, an execution core 208, and an interface unit 211. The fetch control unit 201 is coupled to provide a program counter address (PC) for fetching from the instruction cache 202. The instruction cache 202 is coupled to provide instructions (with PCs) to the decode unit 204, which is coupled to provide decoded instruction operations (ops, again with PCs) to the mapper 205. The instruction cache 202 is further configured to provide a hit indication and an ICache PC to the fetch control unit 201. The mapper 205 is coupled to provide ops, a scheduler number (SCH#), source operand numbers (SO#s), one or more dependency vectors, and PCs to the scheduler 206. The scheduler 206 is coupled to receive replay, mispredict, and exception indications from the execution core 208, is coupled to provide a redirect indication and redirect PC to the fetch control unit 201 and the mapper 205, is coupled to the register file 207, and is coupled to provide ops for execution to the execution core 208. The register file is coupled to provide operands to the execution core 208, and is coupled to receive results to be written to the register file 207 from the execution core 208. The execution core 208 is coupled to the interface unit 211, which is further coupled to an external interface of the processor 200.

Fetch control unit 201 may be configured to generate fetch PCs for instruction cache 202. In some embodiments, fetch control unit 201 may include one or more types of branch predictors 212. For example, fetch control unit 201 may include indirect branch target predictors configured to predict the target address for indirect branch instructions, conditional branch predictors configured to predict the outcome of conditional branches, and/or any other suitable type of branch predictor. During operation, fetch control unit 201 may generate a fetch PC based on the output of a selected branch predictor. If the prediction later turns out to be incorrect, fetch control unit 201 may be redirected to fetch from a different address. When generating a fetch PC, in the absence of a nonsequential branch target (i.e., a branch or other redirection to a nonsequential address, whether speculative or non-speculative), fetch control unit 201 may generate a fetch PC as a sequential function of a current PC value. For example, depending on how many bytes are fetched from instruction cache 202 at a given time, fetch control unit 201 may generate a sequential fetch PC by adding a known offset to a current PC value.

The instruction cache 202 may be a cache memory for storing instructions to be executed by the processor 200. The instruction cache 202 may have any capacity and construction (e.g. direct mapped, set associative, fully associative, etc.). The instruction cache 202 may have any cache line size. For example, 64 byte cache lines may be implemented in an embodiment. Other embodiments may use larger or smaller cache line sizes. In response to a given PC from the fetch control unit 201, the instruction cache 202 may output up to a maximum number of instructions. It is contemplated that processor 200 may implement any suitable instruction set architecture (ISA), such as, e.g., PowerPC™, or x86 ISAs, or combinations thereof.

In some embodiments, processor 200 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 202 may use virtual address bits for cache indexing and physical address bits for cache tags.

In order to avoid the cost of performing a full memory translation when performing a cache access, processor 200 may store a set of recent and/or frequently-used virtual-to-physical address translations in a translation lookaside buffer (TLB), such as Instruction TLB (ITLB) 203. During operation, ITLB 203 (which may be implemented as a cache, as a content addressable memory (CAM), or using any other suitable circuit structure) may receive virtual address information and determine whether a valid translation is present. If so, ITLB 203 may provide the corresponding physical address bits to instruction cache 202. If not, ITLB 203 may cause the translation to be determined, for example by raising a virtual memory exception.

The decode unit 204 may generally be configured to decode the instructions into instruction operations (ops). Generally, an instruction operation may be an operation that the hardware included in the execution core 208 is capable of executing. Each instruction may translate to one or more instruction operations which, when executed, result in the operation(s) defined for that instruction being performed according to the instruction set architecture implemented by the processor 200. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 204 and mapper 205 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 204 may be provided to the mapper 205. The mapper 205 may implement register renaming to map source register addresses from the ops to the source operand numbers (SO#s) identifying the renamed source registers. Additionally, the mapper 205 may be configured to assign a scheduler entry to store each op, identified by the SCH#. In an embodiment, the SCH# may also be configured to identify the rename register assigned to the destination of the op. In other embodiments, the mapper 205 may be configured to assign a separate destination register number. Additionally, the mapper 205 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 205 may provide the ops, along with SCH#, SO#s, PCs, and dependency vectors for each op to the scheduler 206. The scheduler 206 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 206 may be configured to schedule the ops for execution in the execution core 208. When an op is scheduled, the scheduler 206 may be configured to read its source operands from the register file 207 and the source operands may be provided to the execution core 208. The execution core 208 may be configured to return the results of ops that update registers to the register file 207. In some cases, the execution core 208 may forward a result that is to be written to the register file 207 in place of the value read from the register file 207 (e.g. in the case of back to back scheduling of dependent ops).

The execution core 208 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 208 may be configured to execute predicted branch ops, and may receive the predicted target address that was originally provided to the fetch control unit 201. The execution core 208 may be configured to calculate the target address from the operands of the branch op, and to compare the calculated target address to the predicted target address to detect correct prediction or misprediction. The execution core 208 may also evaluate any other prediction made with respect to the branch op, such as a prediction of the branch op's direction. If a misprediction is detected, execution core 208 may signal that fetch control unit 201 should be redirected to the correct fetch target. Other units, such as the scheduler 206, the mapper 205, and the decode unit 204 may flush pending ops/instructions from the speculative instruction stream that are subsequent to or dependent upon the mispredicted branch.

The execution core may include a data cache 209, which may be a cache memory for storing data to be processed by the processor 200. Like the instruction cache 202, the data cache 209 may have any suitable capacity, construction, or line size (e.g. direct mapped, set associative, fully associative, etc.). Moreover, the data cache 209 may differ from the instruction cache 202 in any of these details. As with instruction cache 202, in some embodiments, data cache 26 may be partially or entirely addressed using physical address bits. Correspondingly, a data TLB (DTLB) 210 may be provided to cache virtual-to-physical address translations for use in accessing the data cache 209 in a manner similar to that described above with respect to ITLB 203. It is noted that although ITLB 203 and DTLB 210 may perform similar functions, in various embodiments they may be implemented differently. For example, they may store different numbers of translations and/or different translation information.

The register file 207 may generally include any set of registers usable to store operands and results of ops executed in the processor 200. In some embodiments, the register file 207 may include a set of physical registers and the mapper 205 may be configured to map the logical registers to the physical registers. The logical registers may include both architected registers specified by the instruction set architecture implemented by the processor 200 and temporary registers that may be used as destinations of ops for temporary results (and sources of subsequent ops as well). In other embodiments, the register file 207 may include an architected register set containing the committed state of the logical registers and a speculative register set containing speculative register state.

Throttle logic 213 may generally include the circuitry for determining the number of certain types of instructions that are being issued through scheduler 206, and sending the gathered data through the throttle interface to a throttle control circuit. In some embodiments, throttle logic 213 may include a table which contains entries corresponding to instruction types that are to be counted. The table may be implemented as a register file, local memory, or any other suitable storage circuit. Additionally, throttle logic 213 may receive control signals from the throttle control circuit through the throttle interface. The control signals may allow throttle logic 213 to adjust how instructions are scheduled within scheduler 206 in order to limit the number of certain types of instructions that can be executed.

The interface unit 211 may generally include the circuitry for interfacing the processor 200 to other devices on the external interface. The external interface may include any type of interconnect (e.g. bus, packet, etc.). The external interface may be an on-chip interconnect, if the processor 200 is integrated with one or more other components (e.g. a system on a chip configuration). The external interface may be an off-chip interconnect to external circuitry, if the processor 200 is not integrated with other components. In various embodiments, the processor 200 may implement any instruction set architecture.

Instruction Throttling

Figure 3:
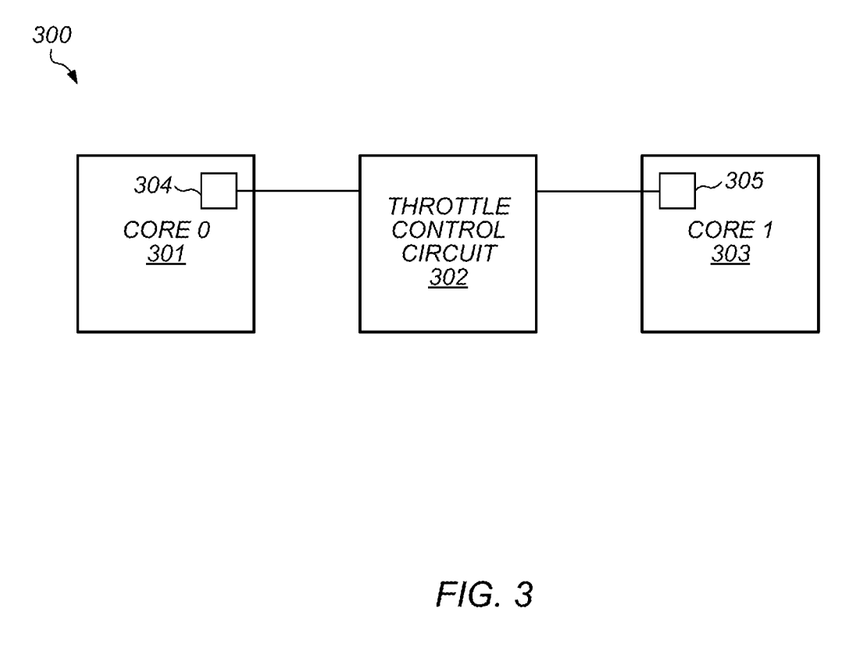
FIG. 3 illustrates an embodiment of a multi-processor system with throttle control.

Turning to FIG. 3, an embodiment of a multi-processor system is illustrated. In the illustrated embodiment, system 300 includes processor core 301, processor core 303, and throttle control circuit 302. In some embodiments, system 300 may be included in an SoC such as, SoC 100 as illustrated in FIG. 1, for example. Processor cores 301 and 303 may, in other embodiments, correspond to processor 101 of SoC 100 as depicted in the embodiment illustrated in FIG. 1.

Processor core 301 includes throttle circuit 304, and processor core 303 includes throttle circuit 305. In some embodiments, throttle circuit 304 and throttle circuit 305 may detect the issue of high power instructions in processor core 301 and processor core 303, respectively. High power instructions may include one or more instructions from a set of instructions supported by a processor that have been previously identified as generating high power consumption during execution. For example, a floating-point (FP), single-instruction-multiple-data (SIMD) instruction type may have wide data lanes for processing vector elements during a multi-cycle latency. Data transitions on such wide data lanes may contribute to high switching power during the execution of such an instruction.

Throttle circuits 304 and 305 may transmit information indicative of the number of high power instructions issued in processor core 301 and 303, respectively, to throttle control circuit 303. Throttle control circuit 302 may estimate the power being consumed by processor core 301 and processor core 303 based on the received information from throttle circuits 304 and 305. Based on the power estimate, throttle control circuit 302 limit (also referred to herein as "throttle") the number of high power instructions being issued in processor core 301 and processor core 303.

In some embodiments, throttle control circuit 302 may set the same limit on the number of high power instructions to be issued for both processor core 301 and processor core 303. Throttle control circuit 302 may, in other embodiments, set one limit on the number of high power instructions to be issued for processor core 301, and set a different limit on the number of high power instructions to be issued for processor core 303.

It is noted that the embodiment of a system illustrated in FIG. 3 is merely an example. In other embodiments, different numbers of processor cores and throttle control circuits may be employed.

Figure 4:
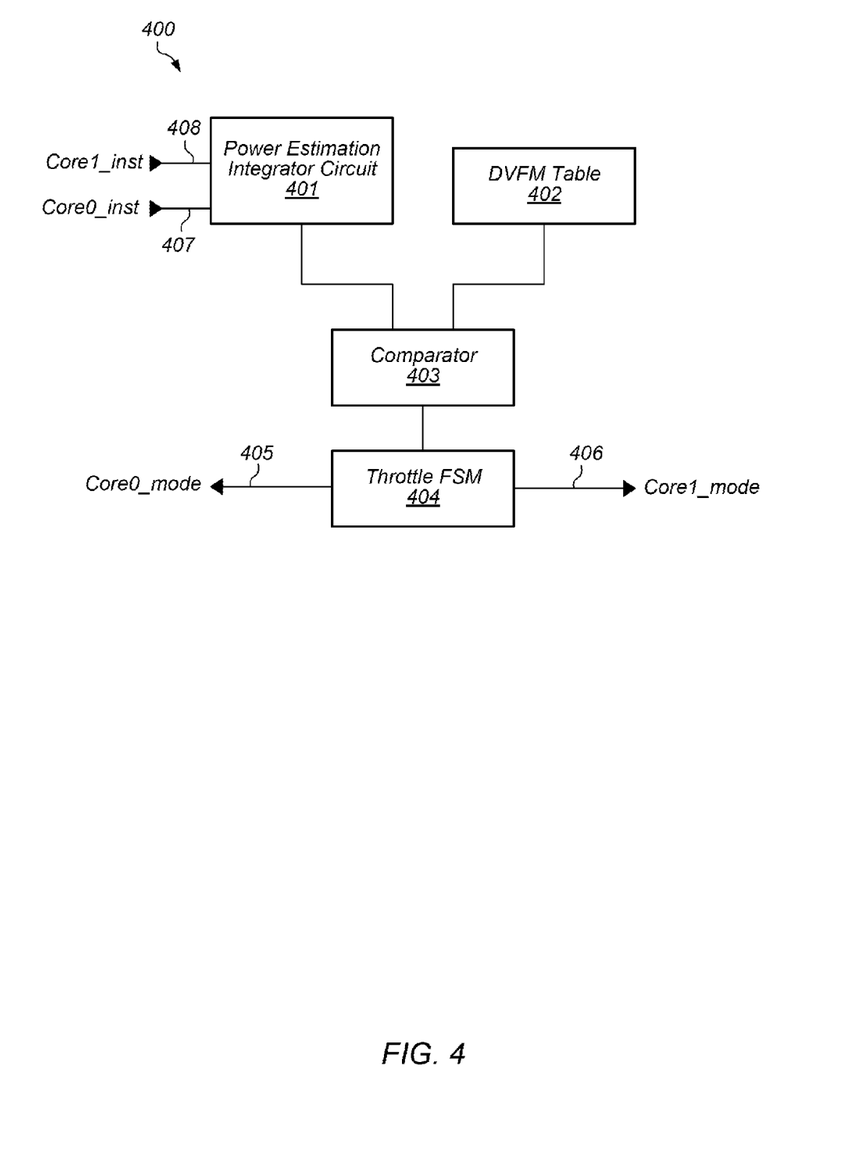
FIG. 4 illustrates an embodiment of a throttle control circuit.

An embodiment of a throttle control circuit is illustrated in FIG. 4. In some embodiments, throttle control circuit 400 may correspond to throttle control circuit 302 of system 300 as illustrated in FIG. 3. The embodiment illustrated in FIG. 4 includes core0 instruction data 407 denoted as "core0_inst," core1 instruction data 408 denoted as "core1_inst," core0 throttle mode 405 denoted as "core0_mode," and core1 throttle mode 406 denoted as "core1_mode." Core0 instruction data 407 and core1 instruction data 408 are coupled to power estimation integrator circuit 401, and power estimation integrator 401 is further coupled to comparator 403. Dynamic Voltage Frequency Management (DVFM) table 402 is also coupled to comparator 403, and the output of comparator 403 is coupled to throttle finite-state machine (FSM) 404. Core0 throttle mode 405 and core1 throttle mode 406 are both coupled to throttle FSM 404.

Power estimation integrator circuit 401 may be configured to receive instruction data from core0 instruction data 407 and core1 instruction data 408, and generate an estimate of power dependent upon the received instruction data. In some embodiments, power estimation integrator circuit 401 may accumulate the received instruction data over a pre-determined period of time (also referred to herein as an "estimation window"), and perform filtering on the accumulated information as part of the power estimation. A timer or counter circuit may be included, in some embodiments, to track the estimation window.

Comparator 403 may be configured to compare the output of power estimator integrator circuit 401 to one or more entries of DVFM table 402. In some embodiments, comparator 403 may employ a bit-wise comparison using exclusive-OR (XOR) gates or any suitable comparison circuit. Dynamic latched comparators, operational amplifiers (Op-amps), and the like, may be employed in other embodiments to compare the output of power estimator integrator circuit 401 and entries from DVFM table 402.

DVFM table 402 may be configured to store one or more pre-determined power threshold values. Each threshold value may include one or more data bits and may be used by throttle FSM 404 to change from one state of throttling to another. In some embodiments, DVFM table 402 may be implemented as a register file, SRAM, or any other suitable memory or storage circuit. Each entry in DVFM table 402 may initially stored in the table during an initialization or startup procedure, and may be updated during the course of operation.

Throttle FSM 404 may be configured to be in one of a finite number of states (also referred to herein as "gears"), where each state corresponds to a different level of throttling for processors coupled to throttle control circuit 400. Throttle FSM 404 may transition from one state to another in response to a triggering event, such as, the result of the comparison between the power estimation and one or more entries of the DVFM table. In some embodiments, each gear may correspond to a different limit on the number of high power instructions that may be issued, thereby providing a gradual performance degradation or performance improvement.

In some embodiments, throttle FSM 404 may, in response to a system reset or any suitable external stimulus, reset the throttle level of one or more processors. The reset may place throttle FSM in gear 0, which may correspond to no limits on the number of high power instructions that may be issued in each of the one or more processors.

Throttle FSM 404 may be implemented using a dedicated sequential logic circuit. In other embodiments, throttle FSM 404 may be implemented as a general-purpose processor configured to execute program instructions that may be stored in a local memory.

It is noted that the embodiment illustrated in FIG. 4 is merely an example. In other embodiments, different circuit blocks and different configurations of circuit blocks are possible and contemplated.

Figure 5:
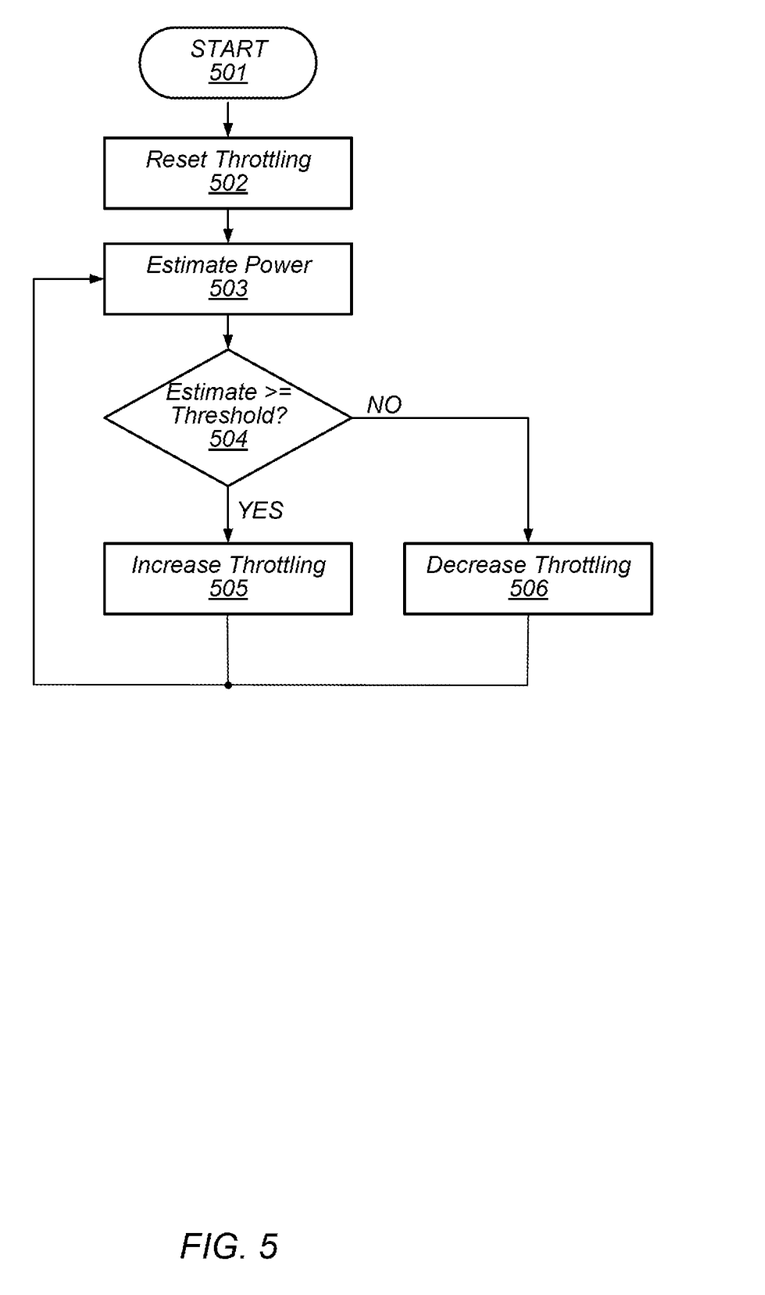
FIG. 5 illustrates a flowchart depicting an embodiment of a method for operating a throttle control circuit.

Turning to FIG. 5, a flowchart depicting an example method for operating a throttle control circuit, such as, e.g., throttle control circuit 400, is illustrated. Referring collectively to the throttle control circuit illustrated in FIG. 4, and the flowchart depicted in FIG. 5, the method begins in block 501.

The throttling level may then be reset (block 502). In response to a system reset, software command, and the like, throttle FSM 404 may reset the throttle level for one or more processors to zero, i.e., no instruction throttling. The reset throttle level may correspond to one of the states throttle FSM 404 is capable of operating in, such as, e.g., gear 0. In other embodiments, throttle FSM 404 may reset the throttle level for only one of the one or more processors.

The power for one or more processors may then be estimated (block 503). Power estimation integrator circuit 401 may receive information from each processor indicative of the number of high power instructions that are being issued, and generate a power estimation dependent upon the received information. In some embodiments, the received information may be accumulated over a pre-determined period of time. At the end of the pre-determined period of time, the accumulated information may be reset. Power estimation integrator circuit 401 may, in other embodiments, performing filtering, such as, e.g., FIR filtering, on the received information.

The method is then dependent upon the value of power estimate (block 504). Comparator 403 may compare the power estimate generated by power estimation integrator circuit 401 to one or more entries of DVFM table 402. Each entry in DVFM table 402 may include a multi-bit word of data that represents a threshold value for transitioning throttle FSM 404 from one state to another. In some embodiments, the comparison between the power estimate and the contents of DVFM table 402 may be on a bit-wise basis.

When the power estimate is greater than or equal to a pre-determined threshold, the throttle level is increased (block 505). Throttle FSM 404 may move into a new state that corresponds to increased throttling for one or more processors. Increased throttling may, in some embodiments, correspond to decreasing a limit on the number of high power instructions that may be issued to the processors. In some embodiments, each processor coupled to throttle FSM 404 may increase their throttling, responsive to the state of throttle FSM 404. Individual throttle limits may be set for each processor coupled to throttle FSM 404, in other embodiments. Once the throttling level has been increased, a new power level may be estimated (block 503).

When the power estimate is less than a pre-determined threshold, the throttle level is decreased (block 506). Throttle FSM 404 may move into a new state that corresponds to decreased throttling for one or more processors. Decreased throttling may, in some embodiments, correspond to increasing a limit on the number of high power instructions that may be issued to the processors. In some embodiments, each processor coupled to throttle FSM 404 may decrease their throttling, responsive to the state of throttle FSM 404. Individual throttle limits may be set for each processor coupled to throttle FSM 404, in other embodiments. Once the throttling level has been decreased, a new power level may be estimated (block 503).

It is noted that operations illustrated in FIG. 5 are depicted as being performed in a sequential manner. In other embodiments, one or more of the operations may be performed in parallel.

Figure 6:
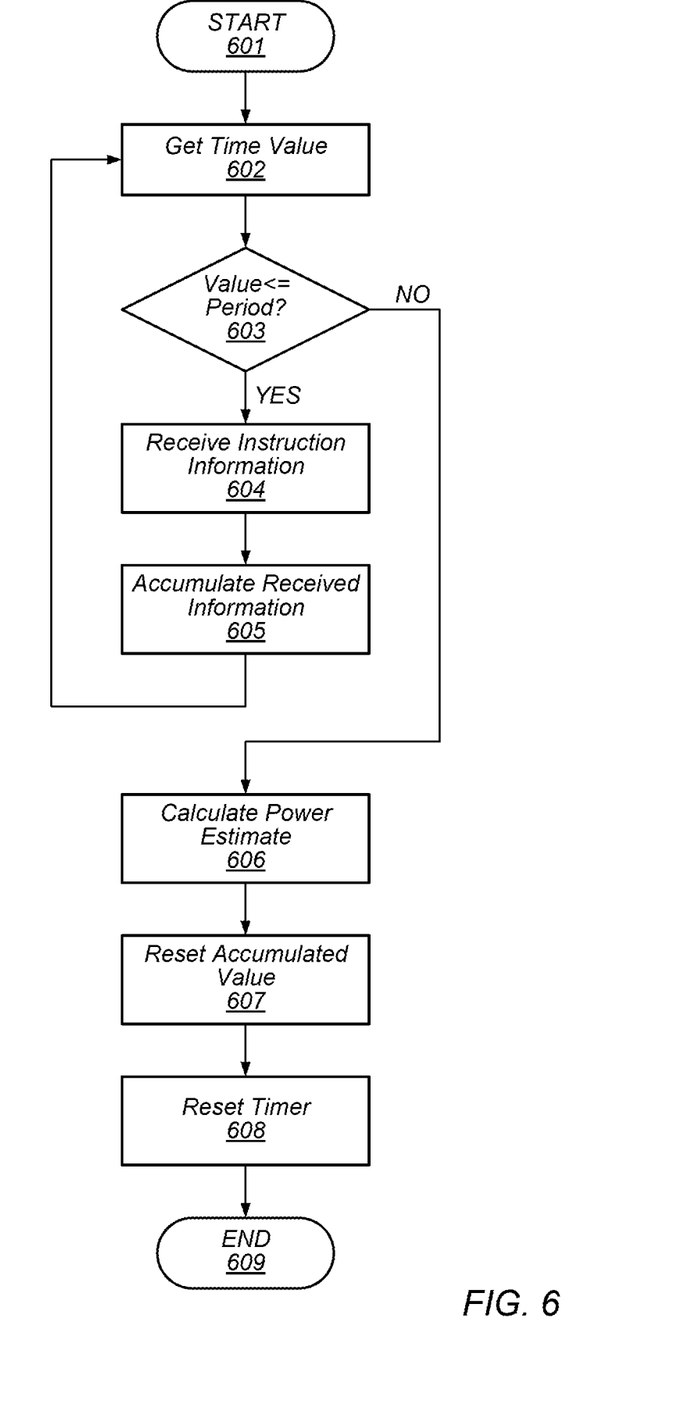
FIG. 6 illustrates a flowchart depicting an embodiment of a method for estimating the power of a multi-processor system.

An example method of estimating power for a multi-processor system, such as system 300, is illustrated in FIG. 6. In some embodiments, the method illustrated in FIG. 6 may correspond to the estimate power operation in block 503 of the method illustrated in FIG. 5. The method begins in block 601.

A current time value may then be retrieved (block 602). The time value may be retrieved from a timer circuit coupled to a time reference, such as, e.g., a crystal oscillator. In other embodiments, the time value may be the output of a counter configured to increment on either the rising or falling edge of a system clock in the multi-processor system.

The method is then dependent on a comparison between the retrieved time value and a pre-determined period (block 603). The pre-determined period may be digital data representative of a time period or, in other embodiments, the pre-determined period may be a number of clock cycles. In some embodiments, the pre-determined period may be stored in a register, local memory, or any other suitable storage mechanism within the multi-processor system, and may be configurable by the execution of program instructions or in response to stimuli external to the multi-processor system, such as a power down request or system interrupt, for example.

When the retrieved time value is less than or equal to the pre-determined period, then information pertaining to high power instructions may be received (block 604). In some embodiments, the information may include the number of high power instructions that have been issued. Such high power instructions may correspond to one or more instruction types that have been previously identified as resulting in increased power consumption within a processor. The instructions may, in some embodiments, be received from one or more processors of the multi-processor system.

The received information may then be accumulated along with previously received information (block 605). In some embodiments, the received information may be added to previously received information to form a running total. The running total may be stored in a register, local memory, or any other suitable storage mechanism on an integrated circuit. The accumulation of received information may be performed by a dedicated circuit, such as, e.g., an adder circuit, or by a general-purpose processor executing program instructions. When the accumulated information has been updated with the recently received information, the time value is retrieved (block 602) and the method continues as described above.

When the time value is greater than the pre-determined period, a power estimate may then be generated (block 606) dependent upon the accumulated information. The generation of the power estimate may, in some embodiments, may include filtering the power estimation using FIR filtering or any other suitable filtering technique. The power estimate may be sent onto a comparator such as, e.g., comparator 403 of throttle control circuit 400 as illustrated in FIG. 4.

Once the power estimate has been generated, the accumulated information may be reset (block 607) in preparation for accumulating new data. In some embodiments, the accumulated value may be reset to zero. The timer circuit responsible for maintaining the time value may then be reset (block 608). The method then concludes in block 609.

The method illustrated in FIG. 6 generates a power estimate for one pre-determined time period. It is noted that in other embodiments, the method illustrated in FIG. 6 may be repeated as needed to generate power estimates.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a power estimation circuit coupled to a first processor and a second processor, wherein the power estimation circuit is configured to receive high power instruction information from the first processor and the second processor and generate a power estimate dependent upon the received high power instruction information from the first processor and the second processor;
   a finite-state machine coupled to the first processor and the second processor, wherein the finite-state machine is configured to operate in one of a plurality of logic states, wherein each logic state of the plurality of logic states corresponds to a throttle level for the first processor and the second processor;
   a table configured to:
      store a plurality of pre-determined power threshold values during an initialization; and
      update at least one of the plurality of pre-determined power threshold values after a time period has elapsed since the initialization; and
   a comparator configured to compare the power estimate to each one of the plurality of pre-determined power threshold values;
   wherein the finite-state machine is further configured to transition from a first logic state of the plurality of logic states to a second logic state of the plurality of logic states dependent upon results of the comparison of the power estimate to each one of the plurality of predetermined power threshold values.

2. The apparatus of claim 1, wherein the power estimation circuit is further configured to accumulate the high power instruction information from the first processor and the second processor over a pre-determined period of time.

3. The apparatus of claim 1, wherein the power estimation circuit is further configured to perform finite impulse response (FIR) filtering on the high power instruction information received from the first processor and the second processor.

4. The apparatus of claim 1, wherein to transition from the first logic state to the second logic state, the finite-state machine is further configured to decrease a limit on the number of high performance instructions issued to the first processor and the second processor dependent upon a determination that the estimated power is greater than at least one of the stored pre-determined threshold values.

5. The apparatus of claim 1, wherein to transition from the first logic state to the second logic state, the finite state machine is further configured to increase the limit on the number of high performance instructions issued to the first processor and the second processor dependent upon a determination that the estimated power is less than at least one of the stored pre-determined threshold values.

6. The apparatus of claim 1, wherein the finite state machine is further configured to transition to a third logic state of the plurality of logic states in response to a reset, wherein the third logic state corresponds to no limits of a number of high performance instructions issued to the first processor and the second processor.

7. The apparatus of claim 1, wherein the power estimation circuit is further configured to:
   accumulate the high power instruction information from the first processor and the second processor over a pre-determined period of time; and
   reset the accumulation of the high power instruction information from the first processor and the second processor at the end of the pre-determined period of time.

8. A method, comprising:
   estimating the power of the one or more processors;
   storing, during an initialization, each one of a plurality of initial pre-determined threshold values in a respective entry of a plurality of entries included in a table;
   updating at least one entry of the plurality of entries included in the table after a time period has elapsed since the initialization;
   comparing the estimated power to each entry of the plurality of entries included in the table; and
   transitioning, by a finite state machine coupled to the one or more processors, from a first logic state of a plurality of logic states to a second logic state of the plurality of logic states dependent upon results of comparing the estimated power to each one of the plurality of entries, wherein each logic state of the plurality of logic states corresponds to a respective throttle level of a plurality of throttle levels of the one or more processors.

9. The method of claim 8, wherein estimating the power of the one or more processors comprises receiving high power instruction information for each of the one or more processors.

10. The method of claim 9, further comprising accumulating the high power instruction information for each of the one or more processors for a pre-determined time period.

11. The method of claim 10, further comprising resetting the accumulated high power instruction information at the end of the pre-determined time period.

12. The method of claim 8, wherein transitioning from the first logic state to the second logic state includes reducing an issue limit on the number of high power instructions for at least one of the one or more processors.

13. The method of claim 12, wherein transitioning from the first logic state to the second logic state further includes increasing the issue limit on the number of high power instructions for at least one of the one or more processors.

14. A system, comprising:
a first processor;
a second processor; and
a throttle control circuit, wherein the throttle control circuit is configured to:
estimate the power of the first processor and the second processor;
store, during an initialization, each one of a plurality of initial pre-determined threshold values in a respective entry of a plurality of entries include in a table;
update at least one entry of the plurality of entries included in the table after a time period has elapsed since the initialization;
compare the estimated power to each entry of the plurality of entries included in the table;
wherein the throttle control circuit includes a finite state machine configured to:
operate in one of a plurality of logic states, wherein each logic state of the plurality of logic states corresponds to a throttle level for the first processor and the second processor; and
transition from a first logic state of a plurality of logic states to a second logic state of the plurality of logic states dependent upon results of comparing the estimated power to each one of the plurality of entries, wherein each logic state of the plurality of logic states corresponds to a respective throttle level of a plurality of throttle levels of the first processor and the second processor.

15. The system of claim 14, wherein to estimate the power of the first processor and the second processor, the throttle circuit is further configured to receive high performance instruction information from the first processor and the second processor.

16. The system of claim 14, wherein the throttle circuit is further configured to accumulate high power instruction information from the first processor and the second processor over a pre-determined period of time.

17. The system of claim 14, wherein to estimate the power of the first processor and the second processor, the throttle circuit is further configured to:
receive high performance instruction information from the first processor and the second processor; and
perform finite impulse response (FIR) filtering on the high performance instruction information received from the first processor and the second processor.

18. The system of claim 14, wherein to transition from the first logic state to the second logic state, the throttle circuit is further configured to reduce a limit on the number of high power instructions issued to the first processor and the second processor.

19. The system of claim 18, wherein to transition from the first logic state to the second logic state, the throttle circuit is further configured to increase the limit on the number of high power instructions issued to the first processor and the second processor.

* * * * *